(12) United States Patent
Yu et al.

(10) Patent No.: US 7,102,878 B2
(45) Date of Patent: Sep. 5, 2006

(54) KEYBOARD MOUNTING APPARATUS FOR PORTABLE COMPUTER

(75) Inventors: WeiMing Yu, Shenzhen (CN); Xiao-Zhong Jing, Shenzhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 365 days.

(21) Appl. No.: 10/455,508

(22) Filed: Jun. 4, 2003

(65) Prior Publication Data

US 2004/0190233 A1 Sep. 30, 2004

(30) Foreign Application Priority Data

Mar. 25, 2003 (TW) ........................ 92204608 U (51) Int. Cl.
*G06F 1/16* (2006.01)

(52) U.S. Cl. ................ 361/680; 361/683; 400/82; 235/145

(58) Field of Classification Search ............... 361/680, 361/683, 686; 235/145; 312/223.1, 223.2; 400/82, 124.12, 691, 692; 341/22; 345/168–172; 292/145 R; 220/316, 322, 324, 326
See application file for complete search history.

(56) References Cited

U.S. PATENT DOCUMENTS 5,510,953 A * 4/1996 Merkel ................... 361/680
5,966,284 A * 10/1999 Youn et al. .............. 361/680
6,493,215 B1 * 12/2002 Chiang et al. ........... 361/680
6,672,796 B1 * 1/2004 Chiang et al. ........... 403/327
6,751,089 B1 * 6/2004 Hsieh ..................... 360/680

FOREIGN PATENT DOCUMENTS

TW 348863 12/1998

* cited by examiner

*Primary Examiner*—Gregory Thompson
*Assistant Examiner*—Anthony Q. Edwards
(74) *Attorney, Agent, or Firm*—Wei Te Chung (57) ABSTRACT

A keyboard mounting apparatus for a portable computer includes a keyboard (30), a base housing (50) and a plurality of fasteners (10). The keyboard includes a plurality of tabs (32) extending from a front end thereof, and a flange (34) is bent from an opposite rear end thereof. The base housing includes a sunken socket (52) accommodating the keyboard therein. A plurality of locking slots is defined in a front wall of the socket corresponding to the tabs of the keyboard. A plurality of holes (56) is defined in a rear wall (54) of the socket. A plurality of chambers (57) is defined in communication with respective of the holes. The fasteners are extended through the holes of the base housing, and accommodated in the chambers. Each of the fasteners includes a hook (14) engaging with the flange of the keyboard thereby securing the keyboard to the base housing.

16 Claims, 7 Drawing Sheets

KEYBOARD MOUNTING APPARATUS FOR PORTABLE COMPUTER

BACKGROUND OF THE INVENTION

1. Field of the Invention

The present invention relates generally to keyboard devices, and more particularly to a mounting apparatus for easily installing and removing a keyboard in and from a portable computer.

2. Related Art

Manufacturers of portable computers are striving make them more durable and easier to use. In a conventional assembly method, screws are used to install a keyboard device to a portable computer. The screws are driven into a lower side of the portable computer, thereby fixing the keyboard device. The keyboard device is secure, but its installation or removal (such as for maintenance) is inconvenient.

Taiwan Patent Publication No. 348863 discloses a keyboard mounting apparatus for a portable computer. The mounting apparatus comprises a handle secured to opposite sides of a keyboard, and a button controlling the forward or rearward movement of a plate engaging with the handle. The forward or rearward movement of the plate set a locked or unlocked status of the keyboard in the portable computer. However, the button is disposed at a base housing of the portable computer. Because the portable computer is typically carried about and used at various locations, the button can be easily moved or released due to vibration, impact or inadvertant operation. Moreover, the handle occupies a relatively large space, and detracts from the aesthetic appearance of the portable computer.

For the above reasons, an improved keyboard mounting apparatus for a portable computer is desired.

SUMMARY OF THE INVENTION

Accordingly, an object of the present invention is to provide a keyboard mounting apparatus which readily allows attachment and removal of a keyboard to and from a portable computer.

To achieve the above-mentioned object, a keyboard mounting apparatus for a portable computer in accordance with a preferred embodiment of the present invention includes a keyboard, a base housing and a plurality of fasteners. The keyboard includes a plurality of tabs extending from a front end thereof, and a flange is bent from an opposite rear end thereof. The base housing includes a sunken socket accommodating the keyboard therein. A plurality of locking slots is defined in a front wall of the socket corresponding to the tabs of the keyboard. A plurality of holes is defined in a rear wall of the socket. A plurality of chambers is defined in communication with respective of the holes. The fasteners are extended through the holes of the base housing, and accommodated in the chambers. Each of the fasteners includes a hook engaging with the flange of the keyboard thereby securing the keyboard to the base housing.

Other objects, advantages and novel features of the present invention will be drawn from the following detailed description of the preferred embodiment of the present invention with the attached drawings, in which:

DESCRIPTION OF THE PREFERRED EMBODIMENT

Figure 1:
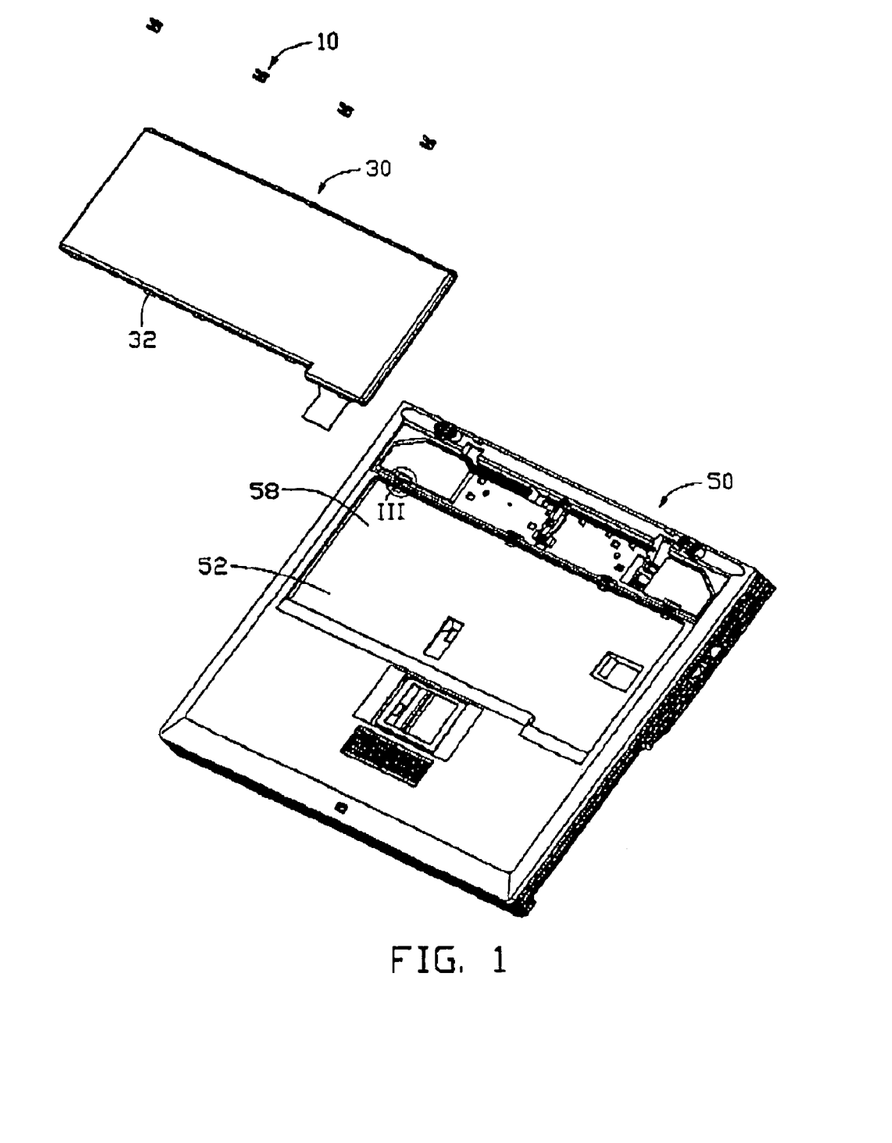
FIG. 1 is an exploded, isometric view of a keyboard mounting apparatus for a portable computer in accordance with the preferred embodiment of the present invention, the keyboard mounting apparatus comprising a keyboard, a base housing of a portable computer and a plurality of fasteners.

FIG. 1 shows a keyboard mounting apparatus in accordance with the preferred embodiment of the present invention. The keyboard mounting apparatus comprises a keyboard 30, a base housing 50 of a portable computer, and a plurality of fasteners 10.

Figure 9:
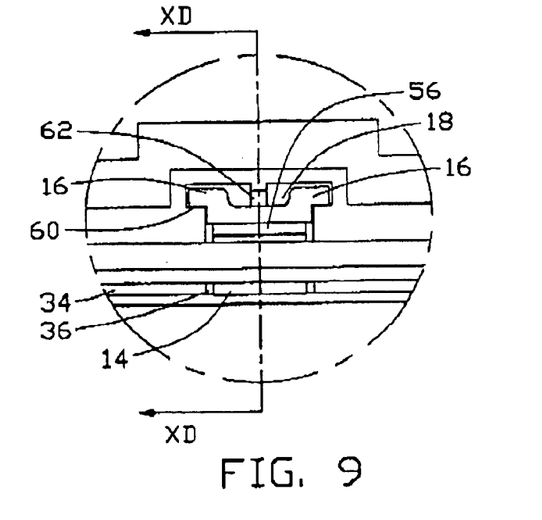
FIG. 9 is an enlarged view of a circled portion IX of FIG. 8.

A plurality of aligned tabs 32 extends forwardly from a front end of the keyboard 30. A flange 34 is bent from an opposite rear end of the keyboard 10 (see FIG. 9D). A plurality of aligned cutouts 36 is defined in the flange 34 (see FIG. 6).

Figure 2:
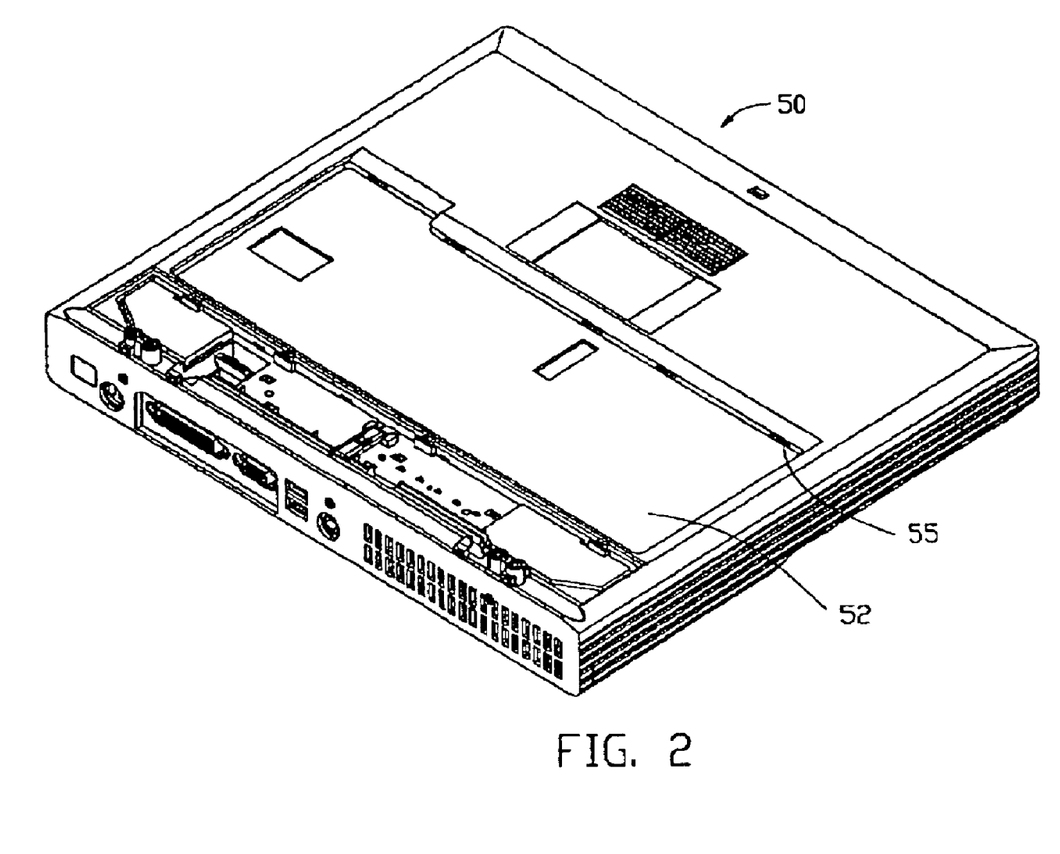
FIG. 2 is an isometric view of the base housing of FIG. 1, but viewed from another aspect.
Figure 3:
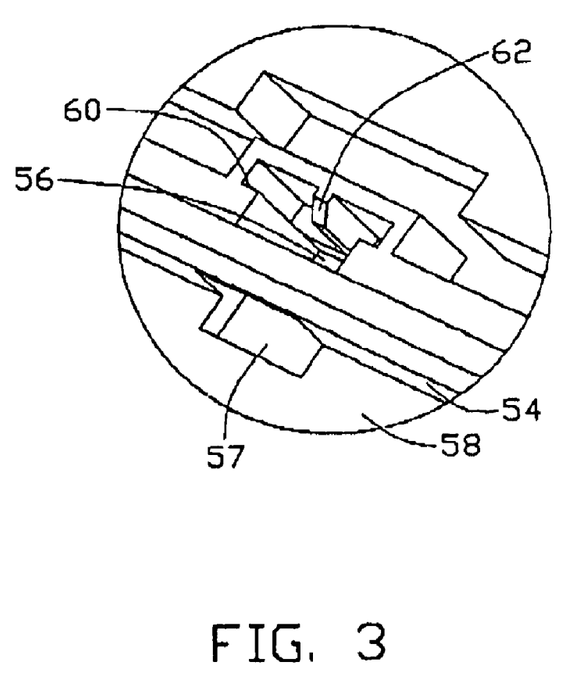
FIG. 3 is an isometric view of a circled portion III of FIG. 1.

Referring to FIGS. 1–3, the base housing 50 defines a sunken socket 52 for accommodating the keyboard 30 therein. The sunken socket 52 comprises a bottom wall 58. A plurality of aligned locking slots 55 is defined along a front wall of the sunken socket 52, corresponding to the tabs 32 of the keyboard 30. An opposite rear wall 54 of the sunken socket 52 defines a plurality of aligned, generally T-shaped holes 56 therealong. A plurality of chambers 57 is defined in a junction of the rear wall 54 and the bottom wall 58, the chambers 57 respectively communicating with the holes 56 and accommodating the fasteners 10 therein. Each chamber 57 below its hole 56 is bounded by a pair of opposite shoulders 60, and a rib 62 protruding from a rearmost portion of the rear wall 54 into the chamber 57.

Figure 4:
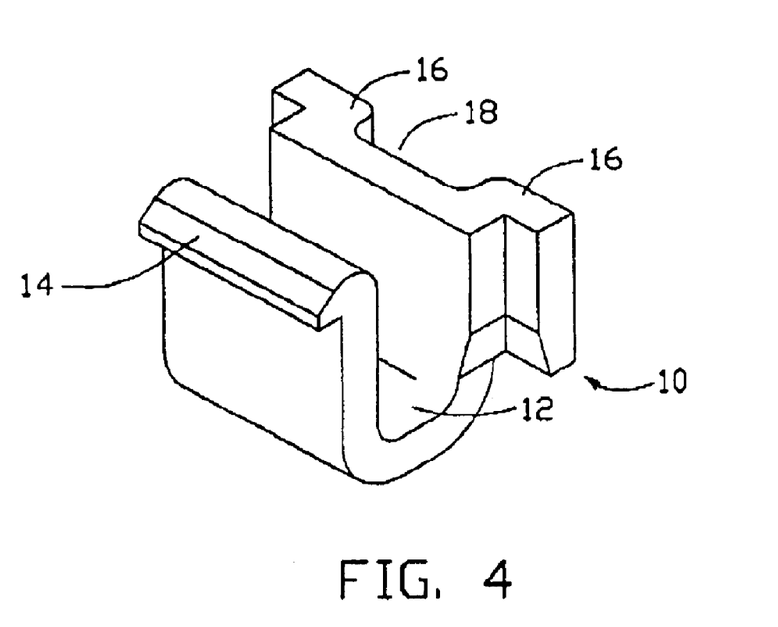
FIG. 4 is an enlarged, isometric view of one fastener of the keyboard mounting apparatus of FIG. 1.
Figure 5:
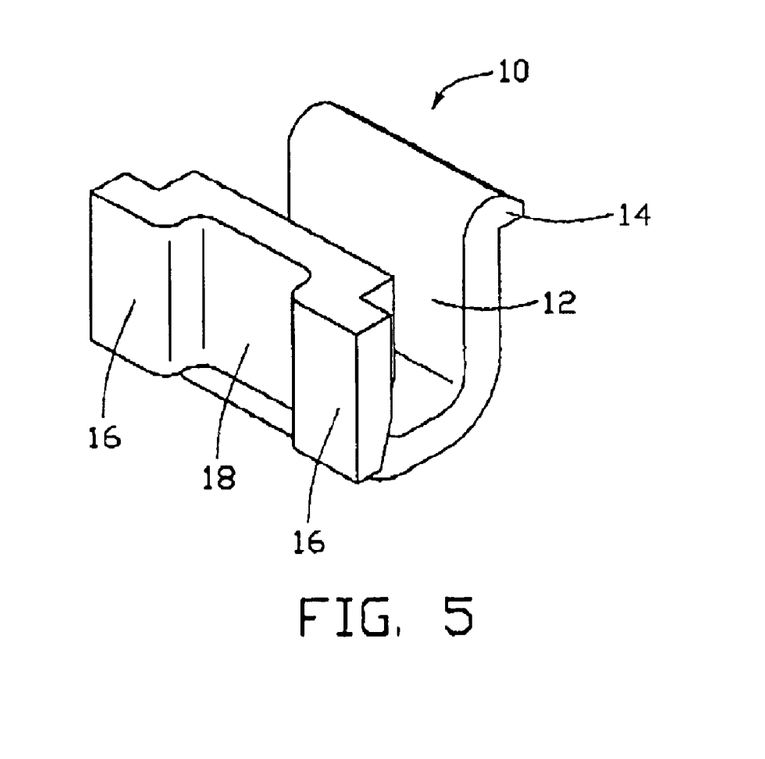
FIG. 5 is similar to FIG. 4, but viewed from another aspect.

Referring to FIGS. 4–5, each fastener 10 is made of elastic material such as plastic, and comprises a U-shaped main body 12. A slanted hook 14 extends outwardly from one end of the main body 12. A pair of wings 16 extends outwardly respectively from opposite lateral sides of an opposite end of the main body 12. A recess 18 is defined between the wings 16, corresponding to a respective one of the ribs 62 of the base housing 50.

Figure 6:
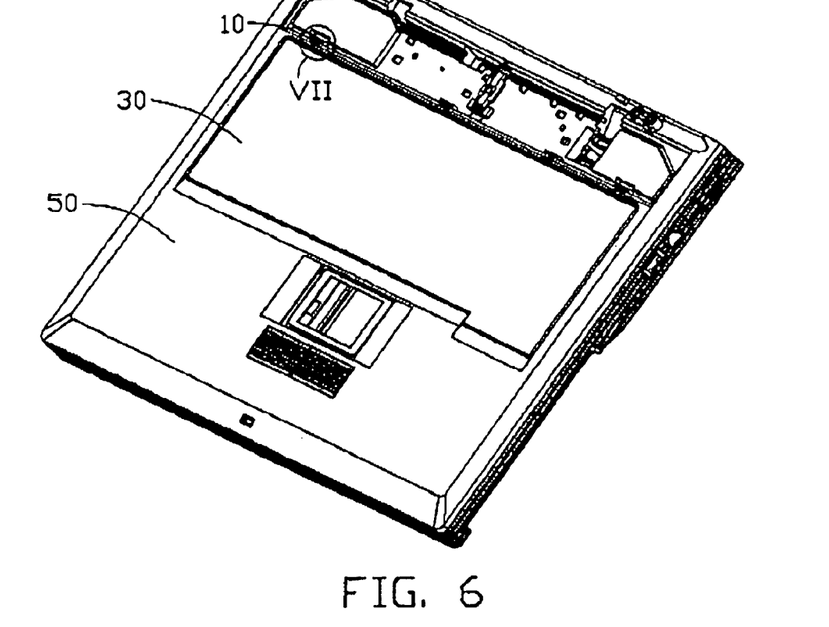
FIG. 6 is an assembled view of FIG. 1.
Figure 7:
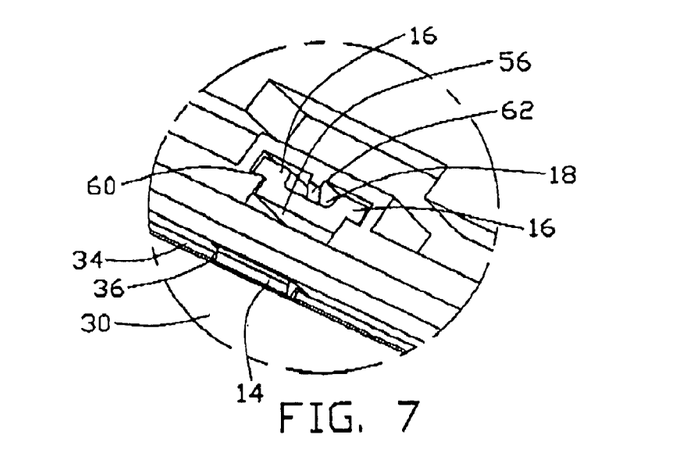
FIG. 7 is an enlarged view of a circled portion VII of FIG. 6.
Figure 8:
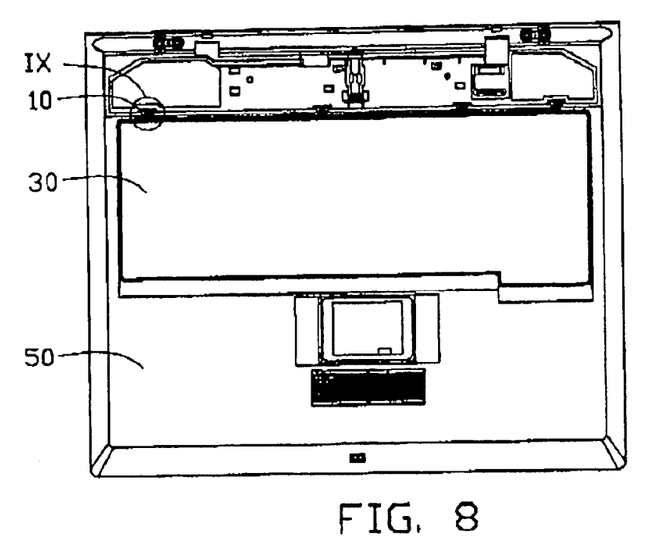
FIG. 8 is a top elevation view of FIG. 6.

Referring to FIGS. 6–8, in assembly, the fasteners 10 are secured in the chambers 57 of the base housing 50. FIGS. 10A–10D show details of the procedure for assembly of each fastener 10 into a corresponding chamber 57. The fastener 10 is inverted, and the hook 14 is inserted through the hole 56 into the chamber 57 and rotated in direction A. When the hook 14 has been completely extended through the chamber 57, the fastener 10 is pressed in direction B until the fastener 10 is fully accommodated in the chamber 57. The wings 16 of the fastener 10 abut the shoulders 60 at the chamber 57, and the recess 18 of the fastener 10 receives the rib 62 at the chamber 57 (see FIGS. 7 and 9). Thus the fastener 10 is secured in the chamber 57. Referring to FIGS. 1 and 6, the tabs 32 of the keyboard 30 are inserted into the corresponding locking slots 55 of the sunken socket 52 of the base housing 50. Then the keyboard 30 is pressed downwardly so that portions of the flange 34 under the cutouts 36 snappingly engage with the hooks 14 of the fasteners 10 (see especially FIGS. 7 and 10D). Thus the keyboard 30 is firmly secured to the base housing 50.

The assembly of the fasteners 10 is simple and saves a lot of space. No extra screwing procedures or welding procedures are required during the assembly, and manufacturing costs of the keyboard mounting apparatus are accordingly reduced.

Figure 10A:
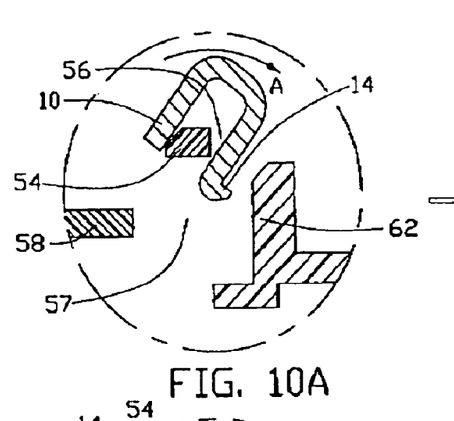
FIGS. 10A–10C are similar to FIG. 10D, but showing progressive stages in manipulating the fastener and the keyboard to arrive at the attachment shown in FIG. 10D.
Figure 10B:
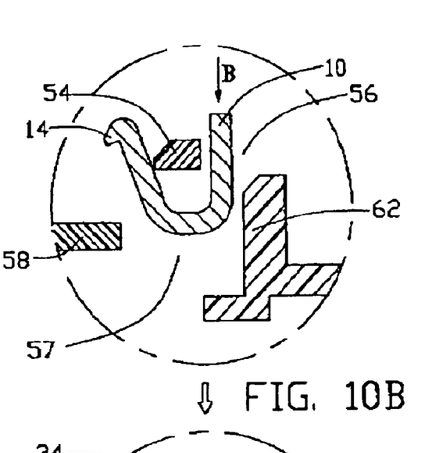
Figure 10C:
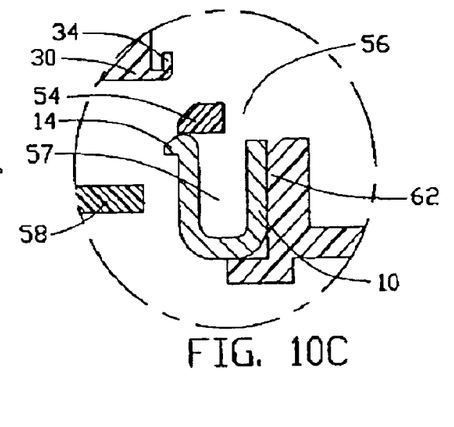
Figure 10D:
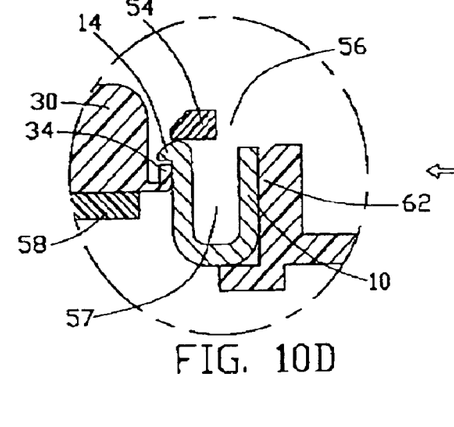
FIG. 10D is a cross-sectional view taken along line XD—XD of FIG. 9, showing one fastener of the keyboard mounting apparatus attaching the keyboard to the base housing.

In disassembly, the hooks 14 of the fasteners 10 are pressed inwardly free from said portions of the flange 34 of the keyboard 30. The keyboard 30 is lifted up to release the flange 34, and then the keyboard 30 is pulled so that the tabs 32 are removed from the corresponding locking slots 55. Thus the keyboard 30 is disassembled from the base housing 50.

It is understood that the invention may be embodied in other forms without departing from the spirit thereof. Thus, the present example and embodiment is to be considered in all respects as illustrative and not restrictive, and the invention is not to be limited to the details given herein.

What is claimed is:

1. A keyboard mounting apparatus for a portable computer, comprising:
    a keyboard comprising a flange disposed at a rear end thereof;
    a housing defining a sunken socket accommodating the keyboard therein, a rear wall of the socket defining a plurality of holes therein, the housing at the socket defining a plurality of chambers in communication with respective of the holes; and
    a plurality of fasteners extended through the holes of the housing and received in the chambers, each of the fasteners comprising a hook engaging with the flange of the keyboard thereby securing the keyboard to the housing, a portion of each of the fastners engaging with a corresponding chamber to be secured therein.

2. The keyboard mounting apparatus as claimed in claim 1, wherein the keyboard further comprises a plurality of tabs extending forwardly from a front end thereof, and the socket of the housing defines a plurality of locking slots in a front wall thereof engagingly receiving the tabs.

3. The keyboard mounting apparatus as claimed in claim 1, wherein the fasteners are made of elastic material.

4. The keyboard mounting apparatus as claimed in claim 1, wherein the flange of the keyboard defines a plurality of aligned cutouts therealong, the cutouts engagingly receiving the hooks of the corresponding fasteners.

5. The keyboard mounting apparatus as claimed in claim 1, wherein each of the holes of the socket is generally T-shaped, and each of the chambers below its hole is bounded by a pair of opposite shoulders and a rib that protrudes from a rearmost portion of the rear wall of the socket.

6. The keyboard mounting apparatus as claimed in claim 5, wherein each of the fasteners comprises a generally U-shaped main body, the hook extends outwardly from one end of the main body, said portion of each of the fasteners comprises a pair of wings extends outwardly respectively from opposite lateral sides of an opposite end of the main body, and the wings abut the shoulders of a corresponding chamber.

7. The keyboard mounting apparatus as claimed in claim 6, wherein the wings of each of the fasteners define a recess therebetween, and the recess receives the rib at the corresponding chamber.

8. A method for mounting a keyboard to a base housing of a portable computer, said method comprising:
    a) providing a keyboard comprising a flange disposed at a first end;
    b) providing a base housing defining a sunken socket, a first wall of the socket defining a plurality of holes, the base housing at the socket defining a plurality of chambers in communication with respective of the holes;
    c) providing a plurality of fasteners each comprising a hook disposed at a second end thereof;
    d) inserting the second end of each of the fasteners through its respective hole and into a corresponding chamber, rotating the fastener to case the fastener to be accommodated in the chamber; and
    e) securing a second end of the keyboard to the socket, pressing the first end of the keyboard downwardly, said flange of the keyboard snappingly engaging with the books of the fasteners.

9. The method as claimed in claim 8, wherein step d) further comprises pressing a first end of the fastener after rotating the fastener.

10. The method as claimed in claim 9, wherein the keyboard further comprises a plurality of tabs extending outwardly from the second end thereof, and the socket of the base housing defines a plurality of locking slots in a second wall thereof engagingly receiving the tabs.

11. The method as claimed in claim 9, wherein the fasteners are made of elastic material.

12. The method as claimed in claim 9, wherein a plurality of aligned cutouts is defined along the flange of the keyboard, the cutouts engagingly receiving the hooks of the corresponding fasteners.

13. The method as claimed in claim 9, wherein each of the holes of the socket is generally T-shaped, and each of the chambers below its hole is bounded by a pair of opposite shoulders and a rib that protrudes from the first wall of the socket.

14. The method as claimed in claim 13, wherein each of the fasteners comprises a generally U-shaped main body, the hook extends outwardly from a second end of the main body, a pair of wings extends outwardly respectively from opposite lateral sides of a first end of the main body, the wings abutting the shoulders of a corresponding chamber.

15. The method as claimed in claim 14, wherein the wings of each of the fasteners define a recess therebetween, and the recess receives the rib at the corresponding chamber.

16. A keyboard mounting apparatus for a portable computer, comprising:
    a keyboard defining an engagement edge section at one end thereof;
    a housing defining a sunken socket receiving the keyboard therein;
    at least one chamber formed in the housing and upwardly exposed to an exterior;

at least one hole formed in the housing, and adjacent to and in horizontal communication with the at least one chamber; and at least one discrete fastener retainably received in the chamber and including a hook section latchably engaged with the engagement edge section and protectively at least partially hidden under a ledge section of the housing; wherein said hook section is deflectable to upwardly release said keyboard; wherein the fastener is retained in the housing by means of engagement among the housing, the fastener and the keyboard without involvement any other fixing components.

* * * * *